Patented Jan. 27, 1942

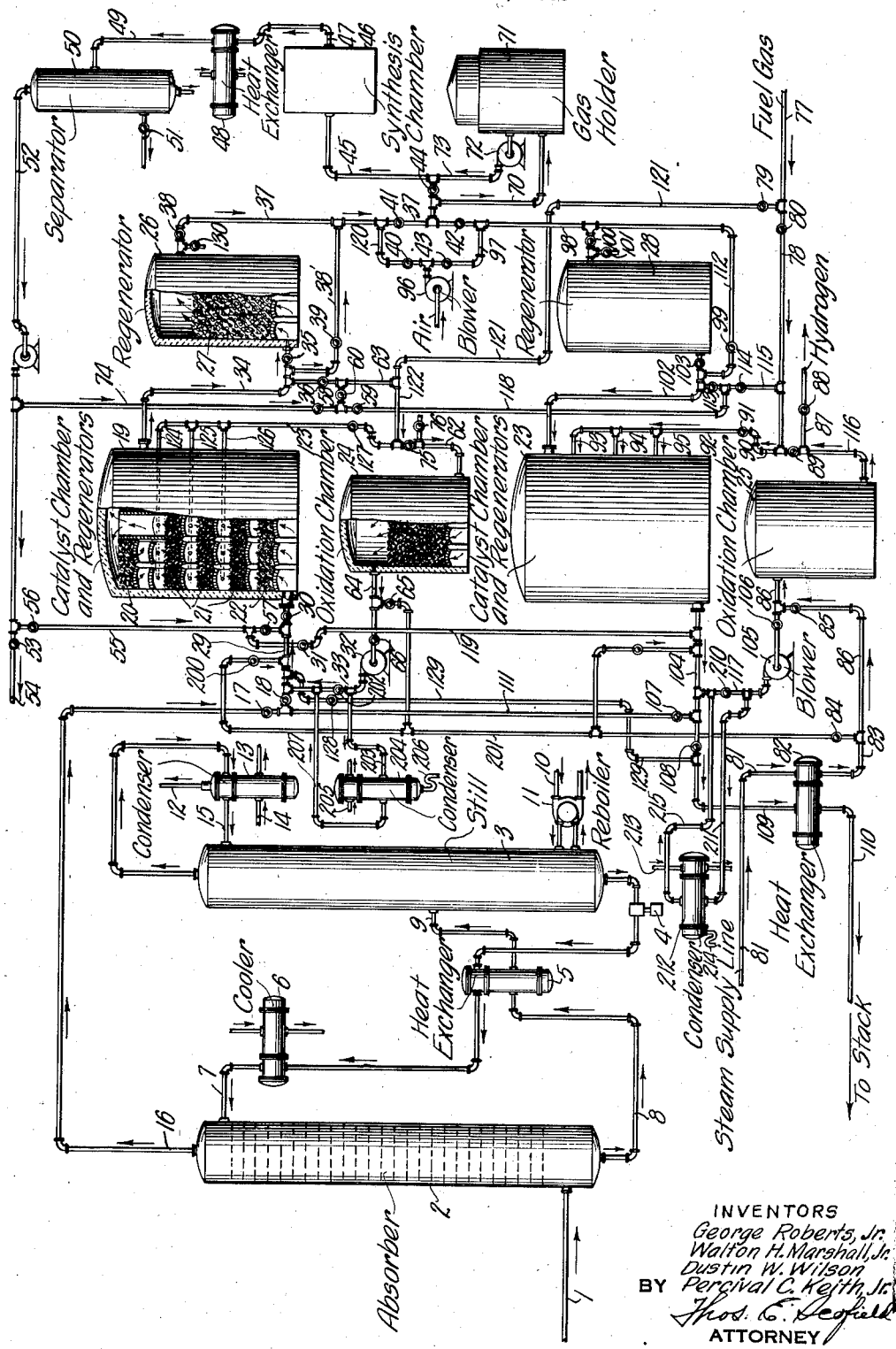

2,270,897

UNITED STATES PATENT OFFICE 2,270,897

METHOD OF MAKING SYNTHESIS GAS

George Roberts, Jr., Montclair, Walton H. Marshall, Jr., Nutley, N. J., Dustin W. Wilson, Scarsdale, N. Y., and Percival C. Keith, Jr., Peapack, N. J., assignors to The M. W. Kellogg Company, New York, N. Y., a corporation of Delaware Application February 17, 1938, Serial No. 190,948

8 Claims. (Cl. 252—373)

Our invention relates to a method of making synthesis gas and more particularly to a method of making a mixture of hydrogen and carbon monoxide having a ratio of hydrogen with respect to carbon monoxide from 1:1 to 3:1 by volume.

Mixtures of carbon monoxide and hydrogen are useful in synthesizing many organic compounds and these mixtures are known to the art as "synthesis gas." The varying of the ratio of carbon monoxide to hydrogen possible in our method is of importance, since the type of product obtained in the liquid synthesis step may be controlled by the ratio of carbon monoxide to hydrogen in the synthesis gas. The ratio also has an effect upon the degree of saturation and the speed and extent of the synthesis reaction.

Synthesis gas may be made, for example, by oxidizing methane according to the following reaction: $CH_4 + \frac{1}{2}O_2 \rightarrow CO + 2H_2$.

Synthesis gas may be made from methane and steam according to the following reaction:

$$CH_4 + H_2O \rightarrow CO + 3H_2$$

It will be observed that, in the above reaction, a mixture of synthesis gas having a ratio of three volumes hydrogen to one volume of carbon monoxide, is obtained. A ratio of one part carbon monoxide to one part hydrogen may be obtained as follows: 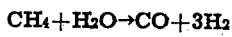 $CH_4 + O_2 \rightarrow CO + H_2 + H_2O$.

Any desirable ratio of hydrogen to carbon monoxide may be obtained by changing the proportions of fresh feed hydrocarbon gas, steam, and oxidation gas, such as carbon dioxide, as will hereinafter be more fully pointed out.

Methane may be obtained from natural gas wells. The oxygen in the air cannot be readily used because of dilution of synthesis gas with nitrogen which is undesirable and which, if present, must be subsequently removed. The presence of nitrogen acts as a diluent which interferes with subsequent synthesis reactions. If nitrogen is present in the synthesis gas, it must be removed by some method such as low temperature rectification, which is expensive.

One object of our invention is to provide for a novel process of forming synthesis gas.

Another object of our invention is to provide for a method of oxidizing methane in which oxygen in combined form is supplied to the system by means of the steam-iron process.

Other and further objects of our invention will appear from the following description.

The accompanying drawing is a diagrammatic view of one form of apparatus capable of carrying out the method of our invention.

When steam is passed over hot iron or one of the lower oxides of iron, oxygen is taken up from the steam, freeing hydrogen. The reactions are as follows:

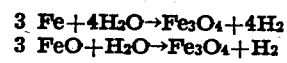
$3 Fe + 4H_2O \rightarrow Fe_3O_4 + 4H_2$
$3 FeO + H_2O \rightarrow Fe_3O_4 + H_2$ The synthesis gas itself being a mixture of carbon monoxide and hydrogen is a reducing gas. When a synthesis gas mixture is passed over the higher oxide of iron formed in the steaming step, as pointed out above, the following reactions take place:

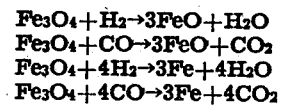
$Fe_3O_4 + H_2 \rightarrow 3FeO + H_2O$
$Fe_3O_4 + CO \rightarrow 3FeO + CO_2$
$Fe_3O_4 + 4H_2 \rightarrow 3Fe + 4H_2O$
$Fe_3O_4 + 4CO \rightarrow 3Fe + 4CO_2$ It will be observed that, in the above reactions, the higher oxide of iron is reduced to a lower oxide or the metal itself, while hydrogen is oxidized to water and carbon monoxide is oxidized to carbon dioxide.

Referring now to the drawing, methane, which may be at a temperature for example of 60° F. and under a pressure of 400 pounds per square inch, is introduced through line 1 into an absorber tower 2. It is important that hydrogen sulphide be removed from the methane so that, in the subsequent conversion of synthesis gas to organic compounds, the catalyst there employed will not be poisoned. Absorber tower 2 may be a packed tower or a bubble tower. As the methane passes upwardly through the tower 2, it is contacted with an absorbent for hydrogen sulphide such as triethanol-amine or monoethanol-amine or the like. The hydrogen sulphide absorbing menstruum is removed from the bottom of a still 3 by pump 4 and passes through heat exchanger 5, cooler 6, and is introduced adjacent the top of the tower through pipe 7. The menstruum containing dissolved hydrogen sulphide flows out of absorber tower 2 under superimposed pressure, through line 8, passes through heat exchanger 5 and is introduced into still 3 through line 9. The hydrogen sulphide is stripped from the menstruum by heat supplied from steam introduced through pipe 10 into a reboiler 11. The hydrogen sulphide passes out of the system through pipe 12. Entrained menstruum and condensable fractions are condensed in a condenser 13 to which a cooling medium is supplied through pipe 14, the condensate returning as reflux to the stripping tower 3 through pipe 15. The absorber operates at any suitable pressure, depending of course upon the pressure at which the methane supplied to it exists. The stripping tower 3 may likewise be operated at any suitable pressure. In the instant case, the pressure within the stripping tower was 10 pounds per square inch gauge. The methane, free of hydrogen sulphide, leaves the absorber through pipe 16 and passes through valve 17 into a manifold 111.

The chamber 19 contains a mass of crushed refractory material forming a regenerator bed 20, catalyst masses 21 and a regenerator mass 22. The catalyst and regenerator chamber 23 is similar in construction to the catalyst and regenerator chamber 19. The catalyst may comprise refractory material upon which has been deposited metallic nickel or mixtures of nickel with manganese. Any suitable catalyst for the conversion of methane into mixtures of carbon monoxide and hydrogen may be employed. Such a catalyst may be prepared by saturating a difficultly reducible oxide with nickel nitrate, drying the mixture, roasting it to decompose the nickel nitrate into nickel oxide, and reducing it in such a way that nickel oxide is converted into metallic nickel.

The oxidation chamber 24 contains a mass of refractory material upon which has been deposited a lower oxide of a metal capable of taking oxygen from steam to form higher oxides which, in turn, are capable of transferring oxygen in combined form to a reducing gas such as hydrogen or carbon monoxide or mixtures thereof. The process may be started with either purified metal oxides or oxide-containing ores or with the metals themselves. These metals or oxides may be used in any convenient form or may be mixed with or deposited on a refractory material, which may be crushed fire brick or the like. The metals titanium, lead, cerium, chromium, iron, tungsten, or molybdenum, or their lower oxides or ores containing the metal or their oxides are suitable.

Oxidation chamber 25 is similar in all respects to oxidation chamber 24. Regenerator chamber 26 contains a mass of crushed refractory material 27. Regenerator chamber 28 is similar in all respects to regenerator chamber 26.

It will be noted that there are two identical sets of equipment used for the synthesis gas cycle. When one of these is on the make cycle, the other is on the regenerative cycle. The length of time each of the sets is on the respective cycle is, of course, determined by the size of the equipment. A typical run will be seven and one-half minutes, after which the sets are interchanged with respect to their cycles.

Referring again to the drawing and considering catalyst chamber 19 being employed on the make cycle and catalyst chamber 23 on the regenerative cycle, the methane freed of hydrogen sulphide, as pointed out above, is introduced into the catalyst and regenerator chamber 19 through pipe 29, valves 17, 18 and 30 being opened and valves 128 and 31 being closed. For purposes of convenience, I will refer to the hydrocarbon gas employed as "methane" though it is to be understood that any other suitable hydrocarbon gas such as ethane, propane, butane or mixtures thereof may be employed in carrying out our method. The regenerator bed 22 will preheat the gas by heat exchange with the hot refractory material which has been previously heated during the regenerative cycle. The regenerator beds and the catalyst mass have been previously heated to a temperature between 1800° F. and 2200° F. during the regenerative cycle. The temperature range is given by way of illustration only and not by way of limitation as these chambers may be operated between the temperature range of from 1500° F. to 2500° F.

The output from the oxidation chamber 24 is passed into line 29 by blower 32 through pipe 33. This output will comprise a mixture of steam and carbon dioxide. Steam may react with methane according to the following reaction:

$2CH_4 + 2H_2O \rightarrow 2CO + 6H_2$.

When it is desired to produce a synthesis gas mixture in which the ratio of hydrogen to carbon monoxide is high, it will be necessary to introduce additional steam into the mixture going to the catalyst chamber 19. This is done by opening valve 84 and valve 200, permitting steam to flow from the steam supply line through pipe 201 into the manifold 29 leading to the catalyst chamber 19.

Carbon dioxide may react with methane according to the following reaction:

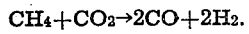

$CH_4 + CO_2 \rightarrow 2CO + 2H_2$.

When it is desired to make synthesis gas in which the ratio of hydrogen to carbon monoxide is less than 2:1, water is removed from the system. When operating in this manner, valve 202 is closed and the output from the oxidation chamber 24 passes through pipe 203 through condenser 204 to which cooling water is supplied through pipe 205. The water condensed in condenser 204 is withdrawn through trapped pipe 206 and the carbon dioxide passes through pipe 207 into the manifold 29 for introduction into the catalyst and regenerator chamber 19. In such case, the tail gas from the synthesis step will contain a considerable proportion of carbon monoxide since, in the synthesis step, the respective gases are consumed approximately in the ratio of 2:1. In such case, the tail gas will be recycled to the oxidation chambers so that carbon monoxide can be converted to carbon dioxide without first being passed through the combination catalyst chambers. If the tail gas contains a large proportion of carbon monoxide, it may not be necessary to pass the output of the oxidation chamber through the condenser to remove water, as the only water which need be removed is that formed by the oxidation of hydrogen and, if the oxidation chamber operates chiefly on carbon monoxide containing a small percentage of hydrogen, the amount of water to be removed will obviously be small.

It will be noted that the sum of the products gives a mixture of carbon monoxide and hydrogen in the ratio of one part of carbon monoxide to two parts of hydrogen, which mixture may be employed in the synthesis step to produce liquid hydrocarbons.

The mixture of carbon dioxide and steam, together with the methane, will be synthesized in the catalyst chamber 19 and the synthesis gas formed will leave the chamber 19 through pipe 34 and pass through the regenerator bed 27, it being understood that valve 35 is open and valve 36 is partially opened as will hereinafter more fully be pointed out. The synthesis gas will be partially cooled by giving up a portion of its heat to the refractory bed 27 and will leave the chamber 26 through pipe 37, valve 38 being open. If desired, a portion of the synthesis gas may by-pass the regenerator 26 through pipe 38' by opening valve 39. While catalyst chamber 19 is on the make cycle, valves 40 and 42 are closed and valves 41 and 43 are open. The synthesis gas may flow directly from pipe 37 through valve 44 into pipe 45 to the synthesis chamber 46 in which the synthesis gas is converted into useful organic compounds by any suitable synthesis process. The excess of synthesis gas formed may pass through pipe 70 into a gas holder 71 whence it may be withdrawn by blower or compressor 72, when desired for use, and pass through pipe 73 into pipe 45. The synthesized products are withdrawn from the synthesis chamber 46 through pipe 47 and passed through a heat exchanger 48, through pipe 49, into a separator 50 from whence the useful products are withdrawn through pipe 51. The unreacted synthesis gas is removed from the separator 50 through pipe 52, whence it may flow to the atmosphere through valve 53 and pipe 54. If desired, the unreacted synthesis gas may be recycled to the catalyst chambers through pipe 55 by opening valve 56, it being understood that when chamber 19 is on the make cycle, valve 57 is open and valve 31 is closed. If desired, the unreacted tail gas may be recycled to the oxidation chambers by closing both valves 53 and 56 and opening valve 58, in which case, the tail gases will flow through pipe 74. After the system has been in operation for a while, nitrogen will build up since a small percentage of nitrogen is always present in the hydrocarbon gas being processed. This nitrogen will not react and eventually will be built up in the system. Too much nitrogen results in dilution of the reactant gases and ensuing lowered efficiency. The tail gas, when nitrogen concentration is high, may be vented. Nitrogen from the air during the heating step, that is, during the regenerative cycle, will remain in the catalyst chamber which has been subjected to heating. The chambers may be purged of the nitrogen by opening valves 130 and 101 for a short period of time when the respective systems are first put on the make cycle. The chambers may be purged with steam if desired.

When oxidation chamber 24 is on the make cycle, valve 59 is closed and valve 60 is open, so that the unreacted tail gas will pass into the oxidation chamber through pipes 63 and 62, along with a portion of the synthesis gas being made, which will pass valve 36.

During the make cycle, a portion of the synthesis gas is bled from the pipe 34 through pipe 63 which is controlled by valve 36 and passes to the oxidation chamber through pipe 122 and pipe 62, it being understood that valve 75 is open and valve 76 is closed. The synthesis gas will react with the easily reducible higher metal oxides, reducing them to lower metal oxides as pointed out hereinabove, and the carbon dioxide and steam formed will leave the oxidation chamber through pipe 64, it being understood that valve 66 is open and valve 65 is closed.

When iron oxide is used as a catalyst in the oxidation chambers, a desirable operating temperature will be in the neighborhood of 1300° F. When oxides of other metals are used, these temperatures may vary between 1000° F. and 1500° F. between which temperatures the oxidation and reduction reactions may take place.

When the system is being operated to produce a synthesis gas of a ratio of hydrogen to carbon monoxide of less than 2:1, a portion of the tail gas from the synthesis step, that is, the gas withdrawn from the separator 50 through pipe 52 is passed through pipe 74 into pipe 63 along with the bled synthesis gas, it being understood that valves 58 and 60 are open and valves 59 and 79 are closed. The compressor 32 will pass the products of oxidation through pipe 33 into pipe 29 for passage to the catalyst chamber along with the hydrocarbon gas being converted.

While catalyst chamber 19 is on the make cycle, catalyst chamber 23 and oxidation chamber 25 are on the regenerative cycle. Fuel gas from fuel gas main 77 passes through pipe 78, valve 79 being closed and valve 80 being open.

At the same time, steam from steam supply pipe 81 passes through heat exchanger 82 into manifold 83. Valve 84 is closed and valve 85 is open so that the steam will pass through pipe 86 into the oxidation chamber 25. The oxidation of the oxide ore mass within chamber 25 by means of steam is an exothermic reaction at the temperature of the operation so that the body of metal oxide will rise in temperature during the regenerative step to the desired temperature between 1000° F. and 1500° F. The oxygen being removed from the steam in the manner pointed out above, hydrogen will be released. This hydrogen may be bled through pipe 87 which is controlled by valve 88. By closing valve 88 and opening valve 89, the hydrogen formed will pass into pipe 90 into which, pipe 78, carrying the fuel gas, passes. The fuel gas alone or with hydrogen will pass valve 91 and flow into manifold 92, from which it passes through pipes 93, 94, and 95, leading to burners disposed about the catalyst beds. Air is taken by blower 96 and passed through pipe 97 into pipe 98. Valves 99 and 101 are closed and valve 100 is open so that the air will pass through the regenerator bed within chamber 28, preheating the air.

The preheated air will leave the regenerator 28 through pipe 102, it being understood that valve 103 is open, and pass into the catalyst chamber 23 to support the combustion of the fuel gas in order to reheat the catalyst beds and regenerator beds within the chamber 23. The gases of combustion will leave the chamber 23 through pipe 104. Blower 105 is stopped and valves 106 and 107 are closed.

Valve 108 is open and the gases of combustion will pass through pipe 109 through heat exchanger 82, superheating the steam entering the heat exchanger through pipe 81, and pass through pipe 110 to the stack. The heating is conducted until a temperature of about 2200° F. is reached. During this time, the chamber 19 on the make cycle will have cooled to about 1800° F. at which time the catalyst chambers 19 and 23, together with their respective oxidation chambers 24 and 25, are alternated. When this is accomplished, the hydrocarbon gases to be converted will pass from manifold 111 through valve 107 and pipe 104 into catalyst chamber 23. The synthesis gas will leave the chamber 23 through pipe 102 and pass through regenerator 28, it being understood that valve 103 will be open. Valve 99 may be opened, in whole or in part, to by-pass a portion of the synthesis gases through pipe 112. When chamber 23 is on the make cycle, valves 40 and 42 will be open and valves 41 and 43 will be closed. The synthesis gas will leave manifold 98 and pass to the gas holder or synthesis chamber as before. A portion of the synthesis gas will be bled through valves 113 and 114 through line 115 and line 116 for oxidation in the oxidation chamber, the products of oxidation being withdrawn through pipe 86 and passed by blower or compressor 105 through pipe 117 into pipe 104 to join the hydrocarbon gases passing through the synthesis chamber 23.

When catalyst chamber 23 is being operated to make synthesis gas in which the ratio of hydrogen to carbon monoxide is less than 2:1, valve 210 in line 117 is closed and the output of the oxidation chamber 25 is passed through pipe 211 through a condenser 212 to which cooling water is supplied through pipe 213. The condensed steam is removed from the condenser through trapped pipe 214 and the carbon dioxide is passed through pipe 215 to the manifold 104 for introduction into the catalyst chamber 23.

Tail gas from the separator 50 may pass through pipe 74, valve 59 being opened, into pipe 118 for passage into pipe 115 with a portion of the synthesis gases to the oxidation chamber 25. If valve 58 is closed and valve 56 is opened, valve 57 will also be closed and valve 31 opened to permit the tail gases to pass into pipe 104 through pipe 119. The compressor or blower 96 will force air through pipe 120, since valve 40 is open and valve 43 is closed, through pipe 37, past valve 38, through regenerator 26, through pipe 34 into the chamber 19 to furnish air of combustion for fuel, which passes through pipe 121 and pipe 122 into the manifold 123 for passage through pipes 124, 125, and 126, it being understood that valves 80, 75, 36, and 60 are closed and valves 79 and 127 are open. The hot products of combustion will leave the chamber 19 through pipe 29, valves 18 and 57 being closed and valves 30 and 128 being open, and pass through pipe 129 into pipe 109 for passage through the heat exchanger 82 and pipe 110 to the stack, it being understood that valve 108 is closed.

By way of example and not by way of limitation, a plan capable of carrying out the process of our invention in which 19,000,000 cubic feet of natural gas per day was introduced into the absorber 2 was operated with the absorber at a pressure of 400 pounds per square inch and at a temperature of about 60° F. The natural gas contained 700 grains of hydrogen sulphide per 100 cubic feet of gas. On passing through the absorber 2, substantially all of the hydrogen sulphide was removed. The hydrogen sulphide bearing solution left the scrubber under its own pressure and was heated to about 185° F. in the heat exchanger 5 and passed into the still 3. About 210,000 cubic feet of hydrogen sulphide a day was removed. About 50 gallons per minute of the absorbing solution was introduced into the absorber and about 3,000 pounds of steam per hour were required for stripping.

Operating at a rate to produce a synthesis gas having a ratio of two parts hydrogen to one part carbon monoxide by volume, approximately 35,000,000 cubic feet per day of gas are recycled through the oxidation chambers. About 55,000,000 cubic feet of synthesis gas per day was formed which, when passed to the liquid synthesis step, produced approximately 1300 barrels a day of hydrocarbon liquids comprising butane and heavier hydrocarbons.

During the regenerative cycle, about 69,000 pounds of steam per hour, preheated to a temperature of about 860° F. are passed into the oxidation chambers. This produces about 35,000,000 cubic feet per day of a mixture of hydrogen and steam. These gases admixed with about 2,400,000 cubic feet a day of natural gas are introduced into the catalyst chambers as fuel being burned with the aid of about 75,700,000 cubic feet of air a day. This produces about 104,000,000 cubic feet of flue gas, the heat of which is used to heat the incoming steam, the flue gases leaving the stack at a temperature of about 1200° F.

It will be observed that we have accomplished the objects of our invention. We have provided a method of making synthesis gas in which oxygen is furnished by the reduction of easily reducible metallic oxides. We have provided a very convenient and expeditious manner of forming synthesis gases from light hydrocarbon gases by the use of readily available raw materials, namely hydrocarbon gases and steam. The necessity of an expensive oxygen plant or carbon dioxide plant is avoided.

Our method is capable of very flexible operation to produce synthesis gas mixtures of any desired ratio of carbon monoxide and hydrogen between the ratios of three parts hydrogen to one part carbon monoxide and equal parts of carbon monoxide and hydrogen.

The by-product from the regenerative step of the oxidation agent, that is the formation of higher oxides from lower oxides by the use of steam, is very pure hydrogen. This pure hydrogen is ideally suited for use in any type of hydrogenation reaction and it would be commercially feasible to operate our method near the site of a hydrogenation plant so that the hydrogen may be usefully employed. The hydrogen may, if desired, be used for fuel. Our method of synthesis gas manufacture is highly economical and the use of alternate systems on respective make and regenerative cycles renders the operation substantially continuous.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of producing a synthesis gas mixture of carbon monoxide and hydrogen in catalytic contact zones, operated alternately on blast and make cycles, in which the blast cycle comprises burning fuel with air to raise the temperature of a catalytic contact zone to between 1800° F. and 2200° F. and the make cycle comprises subjecting a mixture of a hydrocarbon gas, steam and carbon dioxide to catalytic conversion in a contact zone between the temperatures of 2200° F. and 1800° F. in the presence of a catalyst adapted to promote the formation of carbon monoxide and hydrogen from a mixture of a hydrocarbon gas, steam, and carbon dioxide; withdrawing a portion of the synthesis gas being formed, oxidizing the withdrawn portion by contacting an easily reducible metal oxide with the same to form carbon dioxide and steam, and introducing the carbon dioxide and steam into the mixture passing into the contact zone in which the synthesis gas is being formed.

2. In a method of producing a synthesis gas mixture of carbon monoxide and hydrogen in a catalytic contact zone in which a mixture of hydrocarbon gas, steam and carbon dioxide is converted into synthesis gas in the presence of a nickel catalyst between temperatures of 1800° F. and 2200° F., the step of bleeding a portion of the synthesis gas mixture, subjecting the bled portion to oxidation by means of an easily reducible metal oxide to form carbon dioxide and steam, and introducing the carbon dioxide and steam to the catalytic zone as the carbon dioxide and steam used during the conversion step.

3. In a method of producing a synthesis gas mixture of carbon monoxide and hydrogen in which a mixture of a hydrocarbon gas, carbon dioxide and steam is contacted with a catalyst adapted to promote the formation of carbon monoxide and hydrogen from a mixture of a hydrocarbon gas, steam and carbon dioxide at temperatures between 1800° F. and 2200° F., the step of producing the carbon dioxide and steam employed by withdrawing a portion of the synthesis gas produced in the catalytic zone and contacting it with an easily reducible metal oxide.

4. A method of producing a synthesis gas mixture of carbon monoxide and hydrogen in catalytic contact zones operated alternately on blast and make cycles in which the blast cycle comprises burning fuel with air to raise the temperature of a catalytic contact zone to between 1800° F. and 2200° F., and the make cycle comprises subjecting a mixture of a hydrocarbon gas, steam and carbon dioxide to catalytic conversion in a contact zone between the temperatures of 2200° F. and 1800° F. in the presence of a catalyst adapted to promote the formation of carbon monoxide and hydrogen from a mixture of a hydrocarbon gas, steam and carbon dioxide, oxidizing a portion of the synthesis gas formed by contacting it with an easily reducible metal oxide in order to form carbon dioxide and steam, and passing the carbon dioxide and steam formed into the catalytic contact zone.

5. A method of producing a synthesis gas mixture of carbon monoxide and hydrogen in catalytic contact zones operated alternately on blast and make cycles in which the blast cycle comprises burning suitable fuel with air to raise the temperature of the contact zone to between 1800° F. to 2200° F., and the make cycle comprises subjecting a mixture of hydrocarbon gas, steam and carbon dioxide to catalytic conversion at temperatures between 2200° F. and 1800° F. in the presence of a catalyst adapted to promote the formation of carbon monoxide and hydrogen from a mixture of a hydrocarbon gas, steam and carbon dioxide, withdrawing a portion of the synthesis gas formed in the catalytic contact zone, oxidizing the withdrawn gas by means of an easily reducible metal oxide between the temperatures in the vicinity of 1500° F. and 1300° F. to form carbon dioxide and steam, passing the carbon dioxide and steam to the catalytic contact zone as the carbon dioxide and steam employed in the process.

6. A method as in claim 5 in which the spent easily reducible metal oxide is oxidized with steam during the blast cycle to reform a metal oxide and hydrogen.

7. A method as in claim 5 in which the spent easily reducible metal oxide is oxidized with steam during the blast cycle to reform a metal oxide and hydrogen, and the hydrogen is burned to heat the catalytic contact zone to temperatures between 1800° F. and 2200° F.

8. A method of producing a synthesis gas mixture of carbon monoxide and hydrogen in catalytic contact zones operated alternately on blast and make cycles, in which the blast cycle comprises burning stable fuel with air to raise the temperature of the contact zone to between 1500° F. and 2500° F. and the make cycle comprises subjecting a mixture of hydrocarbon gas, steam and carbon dioxide to catalytic conversion at temperatures between 2500° F. and 1500° F. in the presence of a catalyst adapted to promote the formation of carbon monoxide and hydrogen from a hydrocarbon gas-steam-carbon dioxide mixture, withdrawing a portion of the synthesis gas formed in the catalytic contact zone, oxidizing the withdrawn gas by means of an easily reducible metal oxide between temperatures in the vicinity of 1500° F. and 1300° F. to form carbon dioxide and steam, passing the carbon dioxide and steam to the catalytic contact zone as the carbon dioxide and steam employed in the process, oxidizing the spent, easily reducible metal oxide with steam during the blast cycle to reform a metal oxide and hydrogen, and burning the hydrogen to heat the catalytic contact zone.

GEORGE ROBERTS, Jr.
WALTON H. MARSHALL, Jr.
DUSTIN W. WILSON.
PERCIVAL C. KEITH, Jr.